(12) United States Patent
Vermeulen et al.

(10) Patent No.: US 10,331,715 B2
(45) Date of Patent: Jun. 25, 2019

(54) METADATA ENRICHMENT WITH A KEYWORD DEFINITION EDITOR

(71) Applicant: SAP SE, Walldorf (DE)

(72) Inventors: Florent Vermeulen, Levallois-Perret (FR); Alexis L. Naibo, Levallois-Perret (FR); Xiaohui Xue, Courbevoie (FR)

(73) Assignee: SAP SE, Walldorf (DE)

( * ) Notice: Subject to any disclaimer, the term of this patent is extended or adjusted under 35 U.S.C. 154(b) by 396 days.

(21) Appl. No.: 15/190,865

(22) Filed: Jun. 23, 2016

(65) Prior Publication Data

US 2017/0371884 A1    Dec. 28, 2017

(51) Int. Cl.
    *G06F 16/00*    (2019.01)
    *G06F 16/332*   (2019.01)
    *G06F 17/27*    (2006.01)
    *G06F 16/9535*  (2019.01)

(52) U.S. Cl.
    CPC ...... *G06F 16/3322* (2019.01); *G06F 16/9535* (2019.01); *G06F 17/2735* (2013.01)

(58) Field of Classification Search
    None
    See application file for complete search history.

(56) References Cited

U.S. PATENT DOCUMENTS

| | | | | |
|---|---|---|---|---|
| 7,730,009 B1 * | 6/2010 | Higgins | .................. | G06N 5/02 706/50 |
| 7,962,430 B1 * | 6/2011 | Heidenreich | ............ | G06N 5/04 706/45 |
| 2012/0239381 A1 * | 9/2012 | Heidasch | ............ | G06F 17/2785 704/9 |
| 2015/0020105 A1 * | 1/2015 | Roberts | .................. | G11B 27/28 725/44 |
| 2015/0261755 A1 * | 9/2015 | Steiert | ............... | G06F 17/30634 707/750 |

* cited by examiner

*Primary Examiner* — Bai D Vu
(74) *Attorney, Agent, or Firm* — Buckley, Maschoff & Talwalkar LLC

(57) ABSTRACT

A system, method, and computer-readable medium, including receiving a user-supplied expression for which a definition is sought; generating, in response to reception of the user-supplied expression, at least one suggested definition specifying a meaning for the user-supplied expression, the at least one suggested definition being generated based on, at least in part, a knowledge base of metadata associated with a data set; presenting the at least one suggested definition, as at least one keyword, to a user; receiving, in response to the presentation, an indication of one user-selected keyword from the at least one suggested definition; defining the user-selected keyword by at least one value; and persisting the defined user-selected keyword with the at least one value in the knowledge base for the data set.

23 Claims, 7 Drawing Sheets

300

400

800

900

METADATA ENRICHMENT WITH A KEYWORD DEFINITION EDITOR

BACKGROUND

Enterprise software systems receive, generate, and store data related to many aspects of a business enterprise. This data may relate to sales, customer relationships, marketing, supplier relationships, inventory, human resources, and/or finances. Users operate reporting tools to access such data and display the data in useful formats, such as graphic visualizations.

Reporting tools may interact with a semantic layer defining a set of abstract entities known as business objects. Each business object associates one or more physical entities (e.g., a physical database table, associated columns of one or more database tables, etc.) of one or more enterprise data sources with user-friendly names. Business objects may be classified as dimensions, along which one may want to perform an analysis or report (e.g., Year, Country, Product), or measures (e.g., Sales, Profit), whose values can be determined for a given combination of dimension values.

Some conventional reporting tools receive user-submitted queries including dimensions and measures (e.g., Sales by Country), and present one or more visualizations (e.g., bar graph, pie chart, geo-chart) of a corresponding result set. It may be beneficial to display visualizations additional related result sets which may be of interest to the user. However, determination of appropriate queries and generation of such visualizations may require expertise and creativity which the user does not possess.

DETAILED DESCRIPTION

The following description is provided to enable any person in the art to make and use the described embodiments. Various modifications, however, will remain readily apparent to those in the art.

Figure 1:
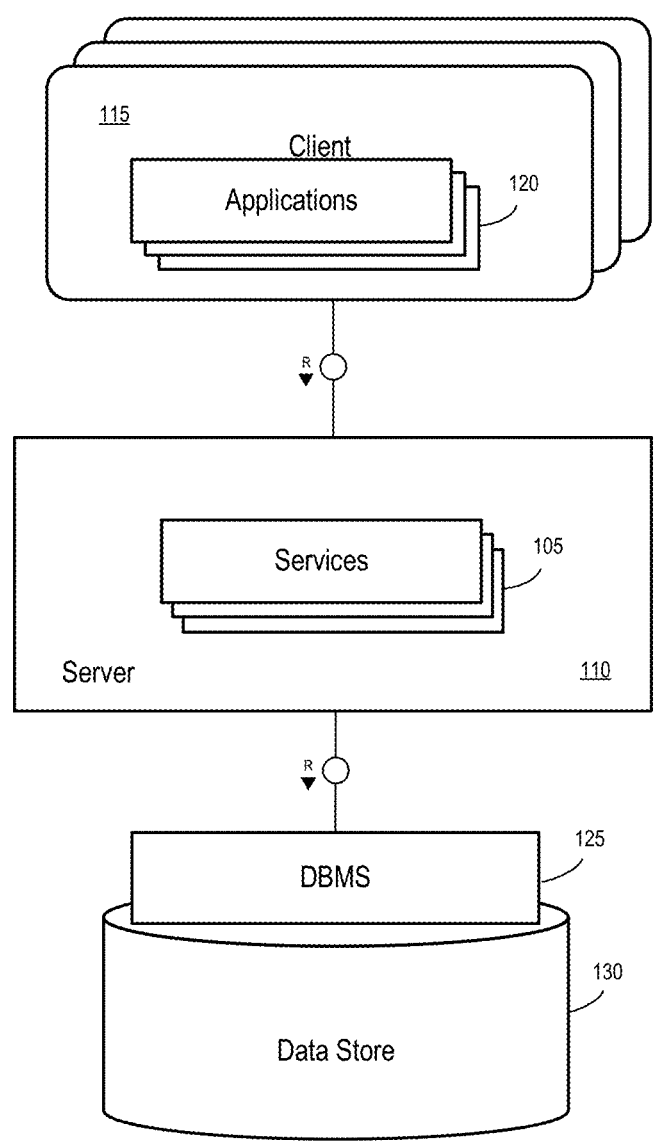
FIG. 1 is a block diagram of a system architecture, according to some embodiments herein.

FIG. 1 is a block diagram of architecture 100 according to some embodiments. Embodiments of the present disclosure are not limited to the particular architecture 100 shown in FIG. 1 or to a database architecture.

Architecture 100 includes services 105 that execute within server 110. Services 105 can receive requests for a service from clients 115 executing applications 120 and reply with responses or results sent to applications 120 based on data stored within data store 130 that is managed by database management system (DBMS) 125.

Services 105 may include server-side executable instructions (e.g., program code such as, for example, compiled code, scripts, etc.) that can provide functionality to applications 120 by providing user interfaces to clients 115, receiving requests from applications 120, retrieving data from data store 130 based on the requests, processing the data received from data store 130, storing some of the processed data on data store 130, providing the processed data to applications 120, and present visualizations of the processed data. Services 105 may be made available for execution by server 130 via registration and/or other security and log-in procedures, which may be known in the art.

In one specific example, a client 15 executes an application 120 to present a user interface to a user on a display of client 115. The user enters a query into the user interface consisting of one or more descriptive words, referred to generally as an expression herein. The query may also include some information designed to limit or filter the results returned in reply to the query. Application operated to send or transmit a request based on the query to one of services 105. In some instances, an SQL script is generated by services 105 based on the request and forwarded to DBMS 120. DBMS 120 executes the SQL script to return a result set based on data (e.g., a data set) of data store 130, and application 120 generates a report/visualization based on the result set.

In some aspects, the user may not be familiar with or otherwise knowledgeable of a data schema and/or other organizational and configurational aspects of the data set(s) stored within data store 130. The user may be an end-user of applications including but not limited to applications 120 (e.g., more than one particular application or client/application configuration may process query requests by leveraging services 105) and/or services 105, wherein typical end-user interactions with clients 115, applications 120, and/or services 105 does not require the end-user to have an understanding of the data schema and/or organizational and configurational aspects of the data set(s) stored within data store 130. As such, the query results returned to the user by application 120 may or may include the information the user desired since the expression submitted by the user that forms the basis of the query may not be sufficiently clear and/or fully defined to be fully understood by services 105.

Server 110 provides any suitable protocol interfaces through which applications 120 executing on clients 115 may communicate with services 105 executing on application server 110. For example, server 110 may include a HyperText Transfer Protocol (HTTP) interface supporting a transient request/response protocol over Transmission Control Protocol (TCP), and/or a WebSocket interface supporting non-transient full-duplex communications between server 110 and any clients 1150 that implement the WebSocket protocol over a single TCP connection.

In some contexts, one or more services 105 executing on server 110 may communicate with DBMS 125 using database management interfaces such as, but not limited to, Open Database Connectivity (ODBC) and Java Database Connectivity (JDBC) interfaces. These types of services 105 may use Structured Query Language (SQL) to manage and query data stored in data store 130.

DBMS 125 may serve requests to query, retrieve, create, modify (update), and/or delete data of data store 130, as well as perform administrative and management functions. Such functions may include snapshot and backup management, indexing, optimization, garbage collection, and/or any other database functions that are or become known. DBMS 130 may also provide application logic, such as database procedures and/or calculations, according to some embodiments. This application logic may comprise scripts, functional libraries and/or compiled program code or instructions.

In some embodiments, server 110 may be separated from or closely integrated with DBMS 110. A closely-integrated server 110 may enable execution of services 105 completely on the database platform, without a need for an additional server. For example, according to some embodiments, server 105 provides a comprehensive set of embedded services that provide end-to-end support for Web-based applications. The services may include a lightweight web server, configurable support for Open Data Protocol, server-side JavaScript execution and access to SQL and SQLScript.

Server 110 may provide application services (e.g., via functional libraries) which services 105 may manage and query a data set of data store 130. The application services can be used to expose the database data model, with its tables, views, and database procedures to clients. In addition to exposing the data model, server 110 may host system services such as, for example, a search service.

Data store 130 may comprise any query-responsive data source or sources that are or become known, including but not limited to a structured-query language (SQL) relational database management system. Data store 130 may comprise a relational database, a multi-dimensional database, an eXtendable Markup Language (XML) document, or any other data storage system storing structured and/or unstructured data. The data of data store 130 may be distributed among several relational databases, dimensional databases, and/or other data sources. Embodiments are not limited to any number or types of data sources.

In some embodiments, the data of data store 130 may comprise one or more of conventional tabular data, row-based data, column-based data, and object-based data. The data may be indexed and/or selectively replicated in an index to allow fast searching and retrieval thereof. Data store 130 may support multi-tenancy to separately support multiple unrelated clients by providing multiple logical database systems which are programmatically isolated from one another.

Data store 130 may implement an "in-memory" database, where a full database stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

As described above, system 100 includes metadata defining business objects that are mapped to logical entities of data store 130. The metadata may include information regarding dimension names (e.g., Country, Year, Product), dimension hierarchies (e.g., Country>State>City; Year>Quarter>Month>Week>Day; etc.), measure names (Profit, Units, Sales) and any other suitable metadata. The metadata be stored in data store 110 and/or a separate repository (not shown).

Each of clients 115 may include one or more devices executing program instructions code of an application 120 for presenting user interfaces to allow user interaction with application server 110. User interfaces (not shown in FIG. 1) of applications 120 may comprise user interfaces suited for reporting, data analysis, and/or any other interface functions based on the data of data store 130.

Presentation of a user interface as described herein may comprise any extent or type of rendering, depending on a type of user interface code or instructions generated by server 110. For example, a client 115 may execute a Web Browser to request and receive a Web page (e.g., in HTML format) from application server 110 via HTTP, HTTPS, and/or WebSocket, and may render and present the Web page according to known protocols. One or more of clients 115 may also or alternatively present user interfaces by executing a standalone executable file (e.g., an .exe file) or code (e.g., a JAVA applet) within a virtual machine. In another method, one of more of clients 115 execute applications 120 loaded from server 110, that receives data and metadata by requests to services 105 executed on the server 110. Data and metadata can be processed by applications 120 to render the user interface on the client 115.

Figure 2:
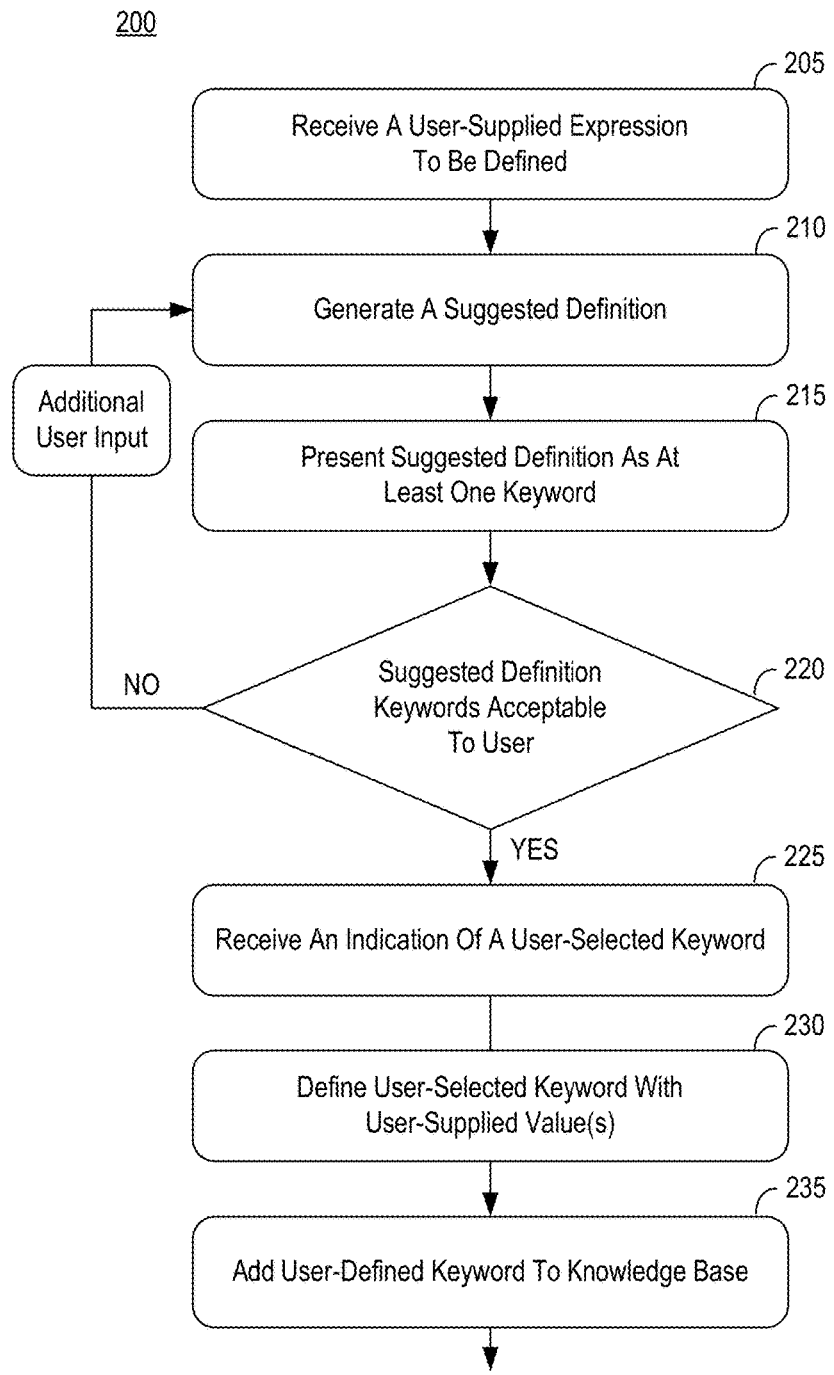
FIG. 2 is an illustrative flow diagram of a process, according to some embodiments.

FIG. 2 comprises a flow diagram of process 200, according to some embodiments herein. In some embodiments, various hardware elements of systems within the scope of the present disclosure execute program instruction to perform process 200. Process 200 and all other processes mentioned herein may be embodied in computer-executable program instructions read from one or more of a tangible non-transitory computer-readable media, such as a floppy disk, a CD-ROM, a DVD-ROM, solid state memory device, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In one aspect, an application (e.g., 120), service (e.g., 105), or system (e.g., 100) may be invoked to query a data set of a data store (e.g., 130) in response to a query initiated by user interacting with one of the application, service, or system. In one particular instance, a user may submit an expression to the application, service, or system that in turn uses that expression to execute a query of the data set. The application, service, or system executes the query and returns results thereof to the user. It may be the case that the user is not satisfied with the query results because, for example, the results do not include at least some of the information the user was expecting to receive. For example, the search results may be too broad, lacking the specific details the user hoped would be included in the results. In some instances, the search results can be irrelevant to what the user was expecting. For example, the application, service, or system may misinterpret the user submitted expression (e.g., the expression is unlike other metadata in a knowledge base of the data set) and/or the user may have submitted an expression using words and/or a format not fully understood by the application, service, or system. In light of the unexpected results (or any other reason), the user may therefore desire a mechanism to more accurately and efficient search the data set to obtain their expected results. One reason may include an initial search process via an application wherein the user desires search results focused on the user's particular query.

Figure 3:
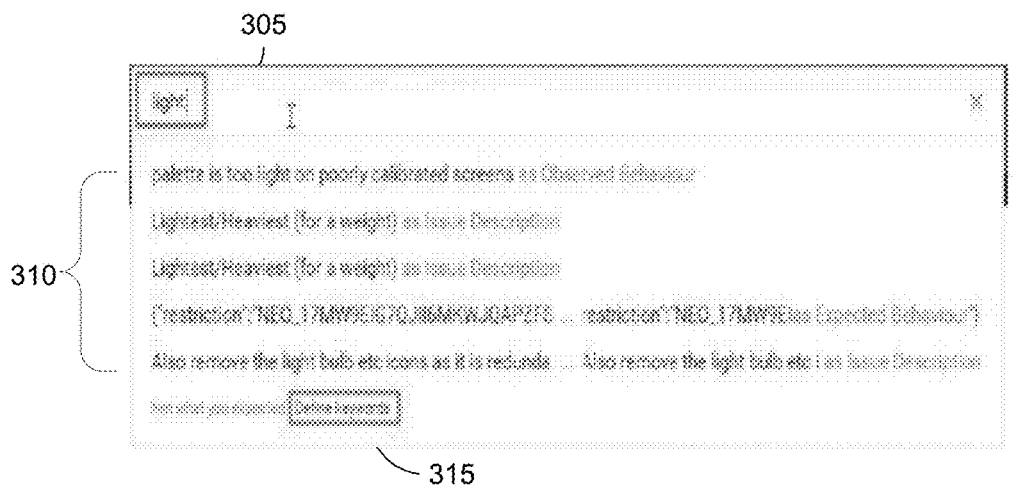
FIG. 3 is an outward view of a displayed user interface according to some embodiments herein.

FIG. 3 illustrates a user interface (or simply interface) 300 presenting search results to a user based on a prior submittal of a search expression or search term 305. In the example of FIG. 3, it is seen at 305 that the user previously entered the expression "light". Interface 300 further includes a listing of search results 310 provided in response to a query of a data set using the expression 305. Search results 310 may include a plurality of "matches" for the expression 305, at least to the extent understood by the application, service, or device executing the query and the contents of the queried data set. Interface 300 may comprise a Web page provided by server 110 in response to a request from a Web browser application 120 executing on client 115. Any client application 120 may be used to display interface 300, which is not limited to Web-based formats.

Continuing the example introduced above, the user may want to have the expression defined because in the course of using the application (e.g., 120) the user invoked a query that yielded less than satisfactory results and process 200, in some embodiments, includes operations to create and save keyword(s) that can be used by the application. Interface 300 of FIG. 3 further includes a user interface element 315 that solicits whether the user would like to "define keywords". Other interface elements and/or mechanism may be used instead of the specific user interface elements 315 shown in 300. More importantly, provided is a mechanism for the user to indicate they would like to define keywords.

Returning to FIG. 2, it is assumed that the user has indicated they want to define keywords or at least initiated or invoked a process (e.g., 200) to define keywords, in accordance with some embodiments herein. At operation 205, an application 120 or service receives a user-supplied expression that the user seeks to have defined by the application.

Figure 4:
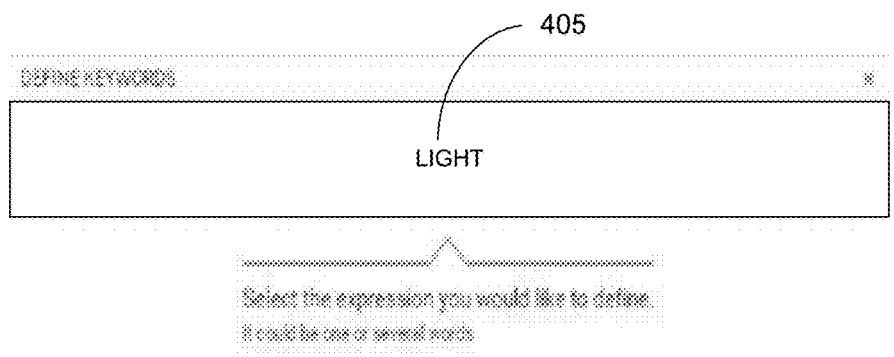
FIG. 4 is an outward view of a displayed user interface according to some embodiments herein.

FIG. 4 is an illustrative depiction of a user interface 400, in accordance with some embodiments herein. In FIG. 4, the expression to be defined is submitted, selected or otherwise indicated by the user by interacting with interface 400. In the example of FIG. 4, the user may type in the expression or select one of more words that they want define. In the example of FIG. 4, the user selects the term "light" 405 that was previously used (although it returned unsatisfactory), for which the user now wants to define to better-suit their usage and expectations. Any method of selecting and/or submitting expressions may be used, in accordance with some embodiments herein, including but not limited to keyed text input, voice, and touchscreen inputs to, for example, a client device 115 executing an application 120 working with a service 105.

Operation 210 includes generating a suggested definition, in the form of at least one keyword, to the user. In accordance with some aspects herein, the suggested definition may be generated by a functionality of a system, service, or application executing a query herein. In some instances, the functionality to generate the suggested definition may be performed separately or as part of one or more other operations, including but not limited to other operations of process 200. The suggest definition may be generated by a suggestion service has access to a knowledge base of a data set, where the knowledge base includes all of the metadata related to the data set. In this manner, the suggestion service, in conjunction with the knowledge base, may generate a listing of one or more keywords from the knowledge base and relating to the data that represents the system, service, or application's interpretation of the user-supplied expression.

At operation 215, the suggestion generated in operation 210 is presented to the user. The presented suggested definition includes the one or more keywords determined to be an interpretation of the user-supplied expression. In operation 215, the system implementing process 200 presents a list of possible definitions for the terms/query (i.e., user-supplied expression) that could map to keyword(s) in a knowledge gaph (e.g., a measure filtred, a dimension filtred or an overload of a grammar word like BY or AVERAGE or a list of filters). The listing of possible definitions may help the user to understand what could be selected on the keyword(s). At operation 220 of process 200, the user may review the presented keywords and decide whether any of the presented keywords is a satisfactory or acceptable definition for their expression. If none of the presented keywords (from the knowledge base associated with the data set) is a satisfactory or acceptable definition for their expression, then process returns to operation 210 and the user and system or application can further iterate to obtain at least one satisfactory keyword. In the instance a user is not satisfied by any of the returned suggestion(s) as a keyword definition at operation 220, the user can type or otherwise enter another input (e.g., text string) for the generating of another suggestion by returning to operation 210. In this manner, other (i.e., better) definitions for the same keyword can be suggested. In the instance at least one of the presented keywords is a satisfactory or acceptable definition for their expression, then process 200 proceeds to operation 225.

Figure 5:
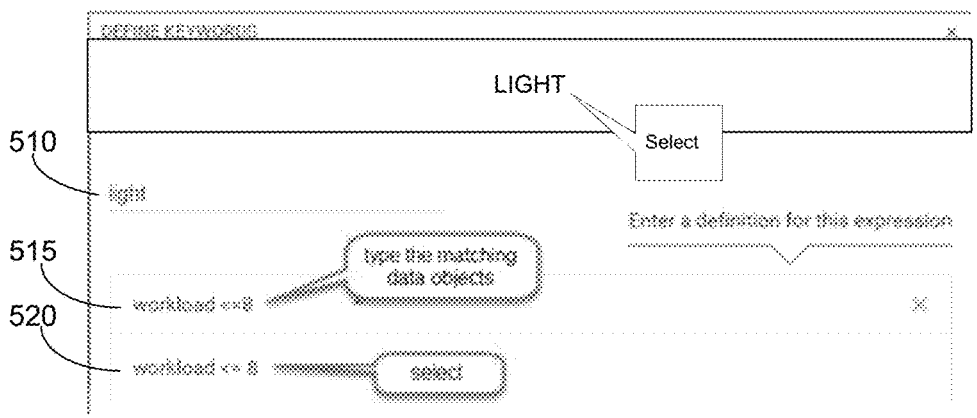
FIG. 5 is an outward view of a displayed user interface illustrating aspects of defining a keyword, according to some embodiments herein.
Figure 6:
FIG. 6 is an outward view of a displayed user interface illustrating some aspects of creating and saving a user-defined keyword, according to some embodiments herein.

At operation 225, the system or application receives an indication of the keyword selected by the user from the list of possible/suggested definitions. The user-selected keyword is selected in response to the presentation of possible definitions presented at operation 215 and, in part, the decision of operation 220. FIG. 5 is an illustrative depiction of a user interface wherein a user has selected a keyword "light" presented at 505. The user's selection is shown in interface 500 at 510.

Operation 230 includes a user defining the keyword (e.g., a dimension of the data set) they selected at operation 225 by specifying at least one value (e.g., a measure) for the user-selected keyword. In this manner, process 200 provides a mechanism wherein an expression for which a user wants defined can be transformed into compatible query term(s) that can be mapped to possible defining keyword(s), where the keyword(s) selected therefrom by the user are then defined with specific values specified by the user.

In accordance with some aspects herein, the keyword may include a measure filter, a dimension filter, a filter, a grammar word, and set of filters. In some aspects, the keywords may include nested keywords. That is, a keyword that is defined, at least in part, by another keyword. In an example, a given keyword may comprise a string of keywords that specify a calculation, where each keyword in the string has an associated meaning and value and as related in the string of keywords forms a particular calculation for the given keyword.

FIG. 5 further shows an example of a user provided definition or value for the expression "light". In the example of FIG. 5, the user enters the value of "workload<=8" at 515 that will be associated by the system with the expression "light" to thereby define the expression mean having a workload less than or equal to eight (in reference to some known scale or metric). At 520 of FIG. 5, the user selects or confirms their entry of the value submitted at 515.

Having specified a definition for the keyword at operation 230, process 200 proceeds to operation 235 where the user-defined keyword is added to and persisted to the knowledge base associated with the data set. In this manner, process 200 provides a mechanism to create, modify, and save keywords that can further enhance the metadata of a data set.

In some embodiments, the user-defined keywords created and defined by processes and systems herein may be used by an application, service, or system in a manner similar to other keywords in the knowledge base (i.e., metadata) associated with a data set and database. As such, the arrow from operation 235 is included to indicate that the user-defined keywords created and defined by process 200 can be used in additional operations and/or processes. For example, user-defined keywords may be used in queries and other operations like keywords defined by application developers and/or a DBMS without any distinction, in some embodiments herein.

In some aspects and embodiments herein, a user may be requested to approve a user-defined keyword before the keyword is persisted to a database or repository, from which it may be retrieved for future use by the application (or other applications). In some aspects, the user may be presented with a visualization of the user-defined keyword after the user defines the keyword and before it is persisted, wherein the user might be required to requested to approve a user-defined keyword before the keyword is persisted to a database or repository, from which it may be retrieved for future use by the application (or other applications).

Figures 7A, 7B:
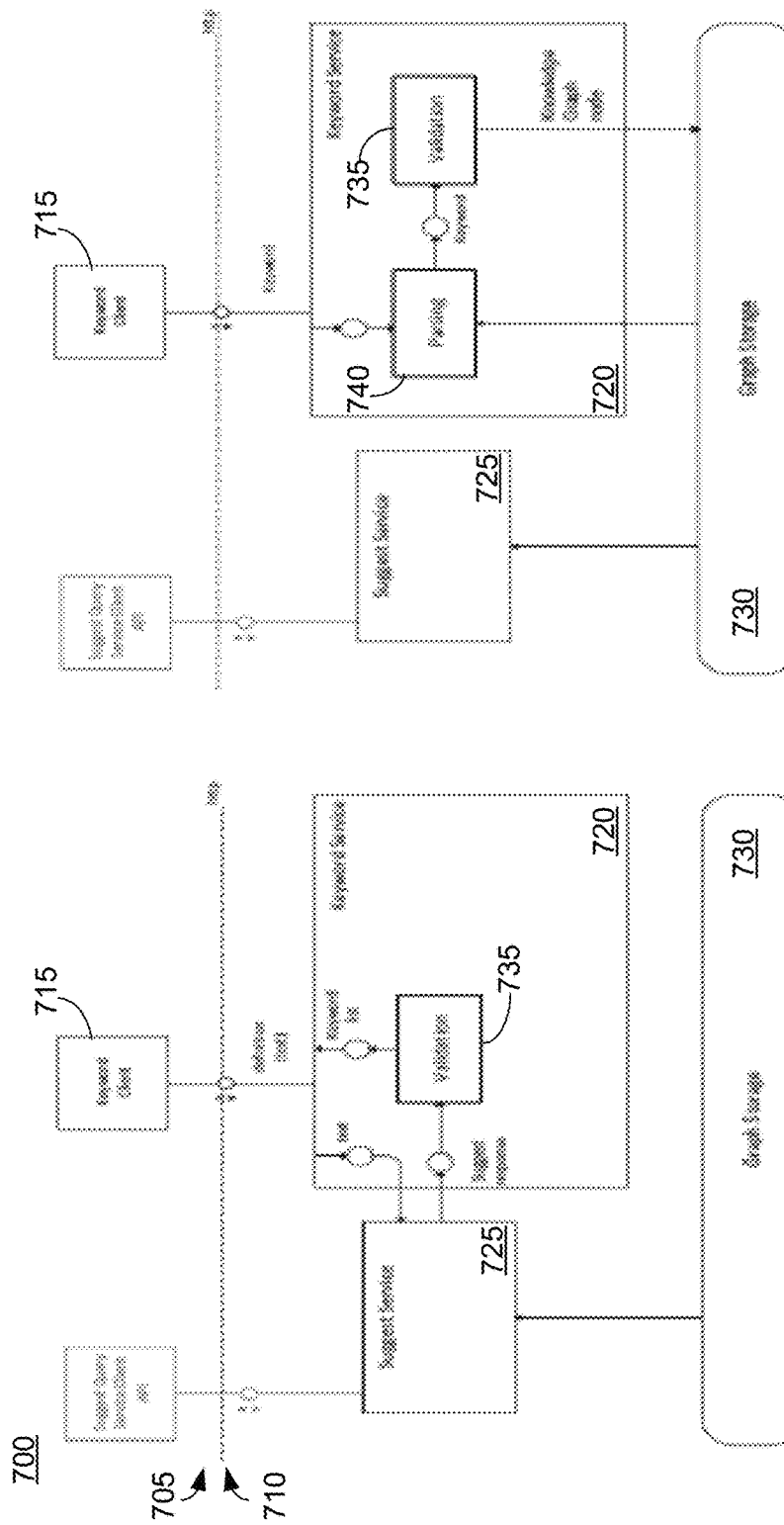
FIGS. 7A and 7B are block diagrams of a system to create and save a user-defined keyword, according to some embodiments herein.

FIGS. 7A and 7B are illustrative block diagrams depictions of a system 700, in accordance with some embodiments herein. System 700 may be embodied, at least in part, as an instantiation of a server delivering a service (e.g., 105). FIG. 7A shows aspects of system 700 that may be used to suggest definitions during the creation of a user-defined keyword and FIG. 7B illustrates aspects of system 700 that may be employed in saving the user-defined keywords created in some embodiments herein. System 700 includes a number of functional modules, each of which may be implemented separately and/or integral to one or more functionalities of system 700, embodied in software, hardware, firmware, and combinations thereof. Systems 700 is shown as including a client side 705 and a server side 710 that communicate via a http protocol.

Figure 8:
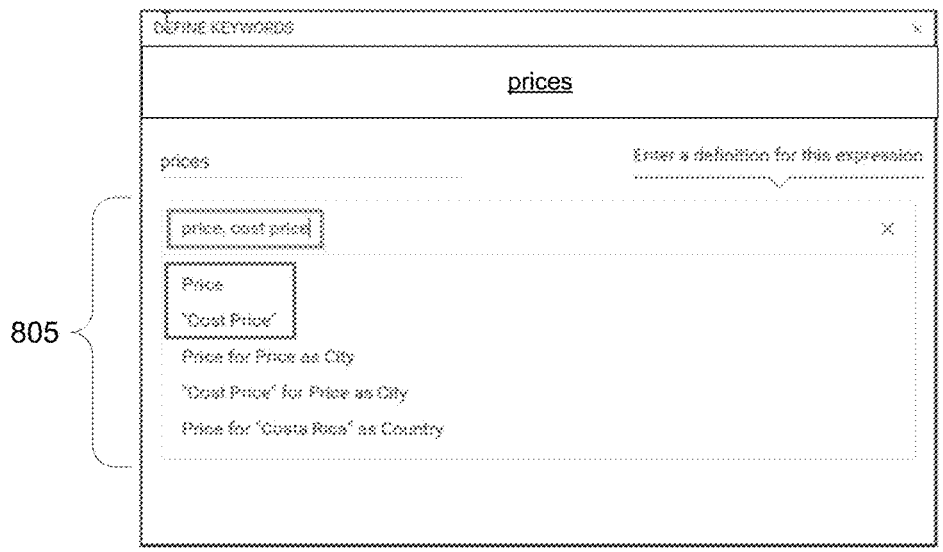
FIG. 8 is an outward view of a displayed user interface illustrating some as aspects herein.

According to FIG. 7A, a client 715 provides a text-based expression to be defined to a keyword service 720. Keyword service receives the textual expression and sends it to suggest service 725 that interprets the user-supplied expression based on the words in the expression and its knowledge of the metadata contained in a knowledge base or graph storage 730 associated with a data set. Suggest service 725 provides one or more suggested definitions to keyword service 720. In some embodiments, keyword service validates the suggested definitions (i.e., interpretations) for the user-supplied expression to ensure that that the suggested definitions include terms that can be used as keywords by an application running on client 715. Suggestion definitions that cannot be used by client 715 and applications thereon may be resubmitted to suggest service 725 or terminated. Upon validation, possible interpretations of the user-supplied expression in the form of suggested definition(s) as keywords are presented to client 715. FIG. 8 is an illustrative depiction of an interface including possible definitions, presented as keywords at 805.

Continuing to FIG. 7B, system 700 receives a user-defined keyword from client 715, wherein the user has selected one of the possible definitions supplied from the suggest service 725 in FIG. 7A and further defined it with at least one value. The user-defined keyword is parsed to ascertain its constituent keywords by parsing module 740. The parsed keywords are further validated by validation module 735 to ensure that these keywords are compatible with the knowledge base 730 (e.g., proper syntax and definitions or values). Validation module 735 may further include a transformation step since the metadata may not necessarily have the same format has the suggestion. This transformation step can be accomplished during the save operation or be part of the general validation. Upon validation, the user-defined keywords are persisted in the knowledge base 730.

Figure 9:
FIG. 9 is an outward view of a displayed user interface, according to some embodiments herein.

FIG. 9 is an illustrative depiction of an interface 900, in accordance with some embodiments herein. Interface 900 includes a visualization including a keyword "workload" at 905 for which a user has defined the meaning of by specifying "Workload=Issue Time Spent", as shown at 910. FIG. 9 further includes visualizations 915 and 920 for the keyword as defined by the user. Visualizations 915 and 920 presents an example of the meaning of the user-defined keyword using data from the data set. In this manner, the user can see the impact and meaning of defining the keyword as they propose defining it. Given the visualization of the user-defined keyword before the keyword is persisted and saved, provides a measure of security regarding the accuracy of the user-defined keyword. In some instances, a user may decide not to have a version of a user-defined keyword persisted after seeing that the keyword as defined does not yield satisfactory results and/or does not mean what they intended to define.

Figure 10:
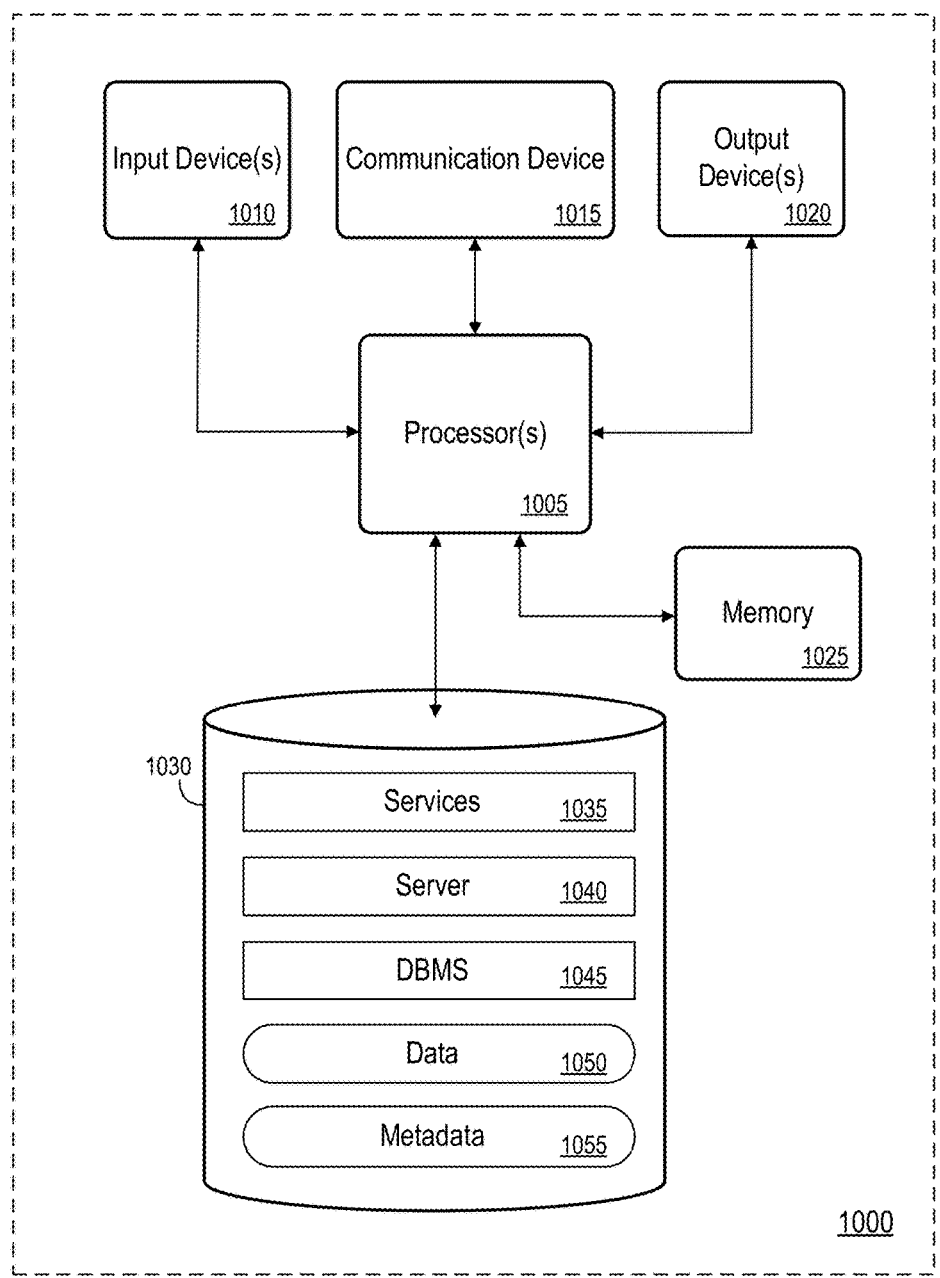
FIG. 10 is a block diagram of an apparatus, according to some embodiments.

FIG. 10 is a block diagram of apparatus 1000 according to some embodiments. Apparatus 1000 may comprise a general-purpose computing apparatus and may execute program code to perform any of the functions described herein. Apparatus 1000 may comprise an implementation of server 110, DBMS 125 and data store 110 of FIG. 1 in some embodiments. Apparatus 1000 may include other unshown elements according to some embodiments.

Apparatus 1000 includes processor 1005 operatively coupled to communication device 1020, data storage device 1030, one or more input devices 1010, one or more output devices 1025 and memory 1025. Communication device 1015 may facilitate communication with external devices, such as a reporting client, or a data storage device. Input device(s) 1010 may comprise, for example, a keyboard, a keypad, a mouse or other pointing device, a microphone, knob or a switch, an infra-red (IR) port, a docking station, and/or a touch screen. Input device(s) 1010 may be used, for example, to enter information into apparatus 1000. Output device(s) 1020 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM), Storage Class Memory (SCM) or any other fast-access memory.

Services 1035, server 1040 and DBMS 1045 may comprise program code executed by processor 1005 to cause apparatus 1000 to perform any one or more of the processes described herein. Embodiments are not limited to execution of these processes by a single apparatus.

Data 1050 and metadata 1055 (either cached or a full database) may be stored in volatile memory such as memory 1025. Metadata 1055 may include information regarding dimension names, dimension hierarchies, measure names, and sets of queries associated with individual queries and/or query patterns. Data storage device 1030 may also store data and other program code for providing additional functionality and/or which are necessary for operation of apparatus 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing processor-executable instructions; and
    a processor to execute the processor-executable instructions to cause the system to:
        receive, by at least one of an application and a system, a user-supplied expression for which a definition is sought from the at least one application and system;
        in response to the reception of the user-supplied expression, generate at least one suggested definition specifying a meaning for the user-supplied expression, the at least one suggested definition being generated based on, at least in part, a stored knowledge base of metadata associated with a data set;
        present, in a user interface of the at least one application and system, the at least one suggested definition, as at least one keyword, to a user;
        receive, in a user interface of the at least one application and system in response to the presentation of the at least one suggested definition, an indication of one user-selected keyword from the presented at least one suggested definition to associate with the user-supplied expression;
        receive, in a user interface of the at least one application and system, at least one value specified by the user to define the user-selected keyword; and
        persist, in a data storage device, the defined user-selected keyword with the at least one value in the knowledge base of metadata for the data set.

2. The system according to claim 1, the processor to further execute processor-executable instructions to cause the system to decompose the generated at least one suggested definition into the at least one keyword presented to the user.

3. The system according to claim 1, the processor to further execute a processor-executable operation to cause the system to:
    decompose the generated at least one suggested definition into a set of keywords;
    determine, for each of the keywords in the set, whether the keyword is valid for use by the at least one application and system to query the data set; and
    including those keywords determined to be valid in the presentation of the at least one suggested definition.

4. The system according to claim 1, the processor to further execute processor-executable instructions to cause the system to:
    present a visualization using the user-selected keyword; and
    in response to the presentation of the visualization using the user-selected keyword, receive a user-supplied indication of the at least one value, wherein the user-supplied indication of the at least one value is used to define the user-selected keyword.

5. The system of claim 1, wherein the persisted defined user-selected keyword is available for use by at least one of the application and the system that queries the data set.

6. The system of claim 1, the processor to further execute processor-executable instructions to cause the system to:
    present a visualization using the user-selected keyword and the at least one value; and
    receive, prior to the persisting of the defined user-selected keyword in the data storage device and in response to the presentation of the visualization using the user-selected keyword and the at least one value used to define it, a user-supplied indication confirming the definition of the user-selected keyword.

7. The system of claim 1, wherein the user-selected keyword is at least one of the following types: a measure filter, a dimension filter, a set of dimension filters, a grammar keyword.

8. A computer-implemented method comprising:
    receiving, by at least one of an application and a system, a user-supplied expression for which a definition is sought from the at least one application and system;
    generating, in response to the reception of the user-supplied expression, at least one suggested definition specifying a meaning for the user-supplied expression, the at least one suggested definition being generated based on, at least in part, a stored knowledge base of metadata associated with a data set;
    presenting, in a user interface of the at least one application and system, the at least one suggested definition, as at least one keyword, to a user;
    receiving, in a user interface of the at least one application and system in response to the presentation of the at least one suggested definition, an indication of one user-selected keyword from the presented at least one suggested definition to associate with the user-supplied expression;
    receiving, in a user interface of the at least one application and system, at least one value specified by the user to define the user-selected keyword; and
    persisting, in a data storage device, the defined user-selected keyword with the at least one value in the knowledge base of metadata for the data set.

9. The method according to claim 8, further comprising decomposing the generated at least one suggested definition into the at least one keyword presented to the user.

10. The method according to claim 8, wherein the user-selected keyword comprises a string of text words.

11. The method according to claim 8, further comprising:
decomposing the generated at least one suggested definition into a set of keywords;
determining, for each of the keywords in the set, whether the keyword is valid for use by the at least one application and system to query the data set; and
in response to the determining, including those keywords determined to be valid in the presentation of the at least one suggested definition.

12. The method according to claim 8, further comprising:
presenting a visualization using the user-selected keyword; and
receiving, in response to the presentation of the visualization using the user-selected keyword, a user-supplied indication of the at least one value, wherein the user-supplied indication of the at least one value is used to define the user-selected keyword.

13. The method of claim 8, wherein the persisted defined user-selected keyword is available for use by at least one of the application and the system that queries the data set.

14. The method of claim 8, further comprising:
presenting a visualization using the user-selected keyword and the at least one value; and
receiving, prior to the persisting of the defined user-selected keyword in the data storage device and in response to the presentation of the visualization using the user-selected keyword and the at least one value used to define it, a user-supplied indication confirming the definition of the user-selected keyword.

15. The method of claim 8, wherein the user-selected keyword is at least one of the following types: a measure filter, a dimension filter, a set of dimension filters, a grammar keyword.

16. A non-transitory computer-readable medium storing processor executable instructions, the medium comprising:
instructions to receive, by at least one of an application and a system, a user-supplied expression for which a definition is sought from the at least one application and system;
instructions to generate, in response to the reception of the user-supplied expression, at least one suggested definition specifying a meaning for the user-supplied expression, the at least one suggested definition being generated based on, at least in part, a stored knowledge base of metadata associated with a data set;
instructions to present, in a user interface of the at least one application and system, the at least one suggested definition, as at least one keyword, to a user;
instructions to receive, in a user interface of the at least one application and system in response to the presentation of the at least one suggested definition, an indication of one user-selected keyword from the presented at least one suggested definition to associate with the user-supplied expression;
instructions to receive, in a user interface of the at least one application and system, at least one value specified by the user to define the user-selected keyword; and
instructions to persist, in a data storage device, the defined user-selected keyword with the at least one value in the knowledge base of metadata for the data set.

17. The medium according to claim 16, further comprising instructions to decompose the generated at least one suggested definition into the at least one keyword presented to the user.

18. The medium according to claim 16, wherein the user-selected keyword comprises a string of text words.

19. The medium according to claim 16, further comprising instructions to:
decompose the generated at least one suggested definition into a set of keywords;
determine, for each of the keywords in the set, whether the keyword is valid for use by the at least one application and system to query the data set; and
in response to the determining, include those keywords determined to be valid in the presentation of the at least one suggested definition.

20. The medium according to claim 16, further comprising instructions to:
present a visualization using the user-selected keyword; and
receive, in response to the presentation of the visualization using the user-selected keyword, a user-supplied indication of the at least one value, wherein the user-supplied indication of the at least one value is used to define the user-selected keyword.

21. The medium according to claim 16, wherein the persisted defined user-selected keyword is available for use by at least one of the application and the system that queries the data set.

22. The medium according to claim 16, further comprising instructions to:
present a visualization of the user-selected keyword; and
receive, prior to the persisting of the defined user-selected keyword in the data storage device and in response to the presentation using the visualization of the user-selected keyword and the at least one value is used to define it, a user-supplied indication confirming the definition of the user-selected keyword.

23. The medium according to claim 16, wherein the user-selected keyword is at least one of the following types: a measure filter, a dimension filter, a set of dimension filters, a grammar keyword.

* * * * *